United States Patent [19]

Bruschtein et al.

[11] Patent Number: 4,537,916

[45] Date of Patent: Aug. 27, 1985

[54] STRUCTURED LATEX PARTICLES WHICH ARE FILM FORMING AND A PROCESS FOR THEIR PREPARATION

[75] Inventors: Fabio B. Bruschtein, Midland; Robert G. Jahn, Saginaw; Edwin L. Wittbrodt, Auburn, all of Mich.

[73] Assignee: The Dow Chemical Company, Midland, Mich.

[21] Appl. No.: 624,329

[22] Filed: Jun. 25, 1984

[51] Int. Cl.³ .............................................. C08L 23/00
[52] U.S. Cl. .................................... 523/201; 524/458; 524/515
[58] Field of Search ................. 523/201; 524/458, 515

[56] References Cited

U.S. PATENT DOCUMENTS

| | | | |
|---|---|---|---|
| 3,254,044 | 5/1966 | Gunderman et al. | 523/201 |
| 3,657,172 | 4/1972 | Gallagher et al. | 523/201 |
| 4,156,669 | 5/1979 | Lee | 523/201 |
| 4,456,734 | 6/1984 | Lindner et al. | 523/201 |
| 4,497,917 | 2/1985 | Upson et al. | 523/201 |

Primary Examiner—Joseph L. Schofer
Assistant Examiner—N. Sarofim
Attorney, Agent, or Firm—Donald L Corneglio

[57] ABSTRACT

A process for preparing structured latex particles having a core and shell region wherein said latex particles are film forming at room temperature by adjusting the feed rates of the shell monomer feeds such that as the weight fraction of the shell increases the feed rate of an acrylate and/or monovinyl monomer or extended core monomer feed of monovinyl aromatic monomer is decreased whereby a shell region encapsulates the core region are described. Structured latex particles prepared by the process are also described. Films of the subject structured latex particle where the shell monomer feed is methylmethacrylate or similar high $T_g$ monomer have good film strength. Further, films of the subject structured latex where the shell monomer feed is butyl acrylate or similar monomers having water repellency characteristics have improved corrosion resistant properties.

20 Claims, No Drawings

STRUCTURED LATEX PARTICLES WHICH ARE FILM FORMING AND A PROCESS FOR THEIR PREPARATION

BACKGROUND OF THE INVENTION

This invention generally relates to a process for preparing structured latex particles which are film forming and whose films exhibit high strength and/or corrosion resistance. Further, this invention is directed toward a continuous polymerization process to form structured latex particles whose films exhibit improved physical characteristics.

Aqueous dispersions of polymers, which are referred to in the art as latexes, are generally known to be useful, both alone and in various formulations, as coatings, adhesives and impregnants. A wide variety of latexes of differing homopolymeric and copolymeric composition (such as styrene/butadiene copolymers, acrylic homopolymers and copolymers, vinylidene chloride homopolymers and copolymers, etc.) have been developed having specific chemical and/or mechanical properties for particular end use applications. For example, aqueous interpolymer latexes resulting from the emulsion polymerization of monovinyl aromatic monomers, such as styrene; diolefins, such as butadiene; and monoethylenically unsaturated carboxylic acids, such as acrylic acid; are known to be particularly useful as film forming binders for pigments in paper coating applications. See, for example, U.S. Pat. Nos. 3,399,080 and 3,404,116.

Aqueous polymer latexes comprising substantial or predominant amounts of vinylidene chloride copolymerized with relatively smaller amounts of other monomers are known to possess a community of desirable properties making them well adapted for wide variety of end uses. Among such properties are reduced flammability, low permeability to oxygen and water vapor, chemical inertness including resistance to greases and oils, good binding power for pigments, fillers, etc., high impact and tensile strength, and the like.

Unfortunately, however, the foregoing advantageous properties of the known latexes are accompanied, to greater or lesser degrees, by certain disadvantageous properties including limited flexibility and elongation, colloidal instability (e.g., sensitivity to, or coagulation upon, storage and/or exposure to mechanical shear). Further, known latexes can suffer from chemical instability (e.g., degradation and/or discoloration by exposure to polyvalent metal ions), water sensitivity, heat and light instability (e.g., degradation and/or discoloration upon exposure to heat and/or light), and corrosive instability (e.g., corrosion occurs from the generation of HCl from the vinylidene chloride moiety present in the latex).

In view of the indicated disadvantages of prior art latexes, it is highly desirable to provide improved latexes which overcome some or all of such disadvantages, particularly those related to film strength (tensile amd elongation) and corrosion resistance.

SUMMARY OF THE INVENTION

The present invention provides a process for preparing a structured latex particle having a core and shell region by a continuous addition emulsion polymerization technique. The core region is formed from core monomer feeds comprising (a) aliphatic conjugated dienes, (b) vinylidene halide or vinyl halide, and/or (c) monovinyl aromatic monomers, and optionally (d) monoethylenically unsaturated carboxylic acids. The shell region is formed from shell monomer feeds comprising (e) an acrylate, and/or (f) a monovinyl aromatic monomer or extended core monomer feed of the same monomer (c), and extended core monomer feeds comprising, independently, (a), (b) or (d). The subject process is characterized by adjusting the feed rate of the aforementioned shell monomer feeds such that as the weight fraction of the shell increases the feed rate of the (e) acrylate and/or (f) monovinyl aromatic monomer or extended core monomer feed of the same monomer (c) is decreased whereby a shell region which encapsulates the core region is formed and the structured latex particle is rendered film forming at room temperature. Preferably, the feed rate adjustment is such that from about 3 to about 30 percent of the latex particle is (e) the acrylate and/or (f) the monovinyl aromatic monomer. More preferably, the feed rate adjustment is such that the shell region is formed from (e) and (g) shell monomer feeds and from 3 to about 30 percent of the latex particle is (e).

Further, the present invention provides a structured latex particle prepared by the above described process. The structured latex particle has from 3 to about 30 percent of the (e) and/or (f) shell monomers. The preferred (e) shell monomers are butyl acrylate and methylmethacrylate and the preferred (f) shell monomers are t-butyl styrene and styrene. More preferably, the shell region is formed from the (e) and (g) shell monomers and from 3 to about 30 percent of the latex particle is (e).

The present invention further provides a film formed from the structured latex particle described above. Preferably, the shell monomer feed is methylmethacrylate. Even further, the present invention provides a film formed from the structured latex particle prepared by the above-described process where the shell monomer feed is butyl acrylate such that the film has improved corrosion resistance.

DETAILED DESCRIPTION OF THE INVENTION

The structured latex particles of the invention generally consist of a major core portion and a lesser shell portion. The shell portion can be of varying composition, as described herein, and varying thickness such that the shell is sufficient to encapsulate the softer core. Preferably, the shell is of a composition and thickness such that it will readily coalesce to form a film at room temperature (i.e., film forming at room temperature). However, where the structured latex particles are employed under high temperature conditions the shell portion can be adjusted either by monomer composition or shell thickness to maintain good film forming characteristics at the required temperature and provide a structured latex particle whose film has desirable characteristics such as high strength and resistance to corrosion. The latter characteristic is particularly desirable where corrosion can be caused by the presence of vinylidene halides in the latex compositions.

Generally, the structured latex particle has a core/shell morphology where the core region is composed of an aliphatic conjugated diene, a vinylidene halide or vinyl halide and/or a monovinyl aromatic monomer and optionally a monoethylenically unsaturated carboxylic acid monomer. The shell region is composed of an acrylate and/or a monovinyl aromatic monomer and, to a varying extent, core monomers which are added by the continuous addition of the various core monomer feeds extended into the shell monomer feed portion of the polymerization process. The term "aliphatic conjugated diene", as used herein, is meant to include compounds such as 1,3-butadiene, 2-methyl-1,3-butadiene, 2,3-dimethyl-1,3-butadiene, 2-neopentyl-1,3-butadiene, piperylene(1,3-pentadiene), and other hydrocarbon analogs of 1,3-butadiene. Examples of other suitable conjugated dienes are disclosed in U.S. Pat. No. 4,156,669.

Vinylidene halides and vinyl halides suitable for this invention include vinylidene chloride and vinyl chloride, which are highly preferred. Vinylidene bromides and vinyl bromide can also be employed.

The term "monovinyl aromatic monomer", as used herein, is meant to include those monomers with a radical of the formula

(wherein R is hydrogen or a lower alkyl such as an alkyl having from 1 to 4 carbon atoms) attached directly to an aromatic nucleus containing from 6 to 10 carbon atoms, including those wherein the aromatic nucleus is substituted with alkyl or halogen substituents. The preferred monomers are styrene and vinyltoluene. Examples of other suitable monovinyl aromatic monomers are disclosed in U.S. Pat. No. 4,156,669.

The term "monoethylenically unsaturated carboxylic acid monomer", as used herein, is meant to include those monocarboxylic monomers such as acrylic acid, and methacrylic acid; dicarboxylic monomers such as itaconic acid, fumaric acid, maleic acid, and their monoesters. However, it is understood by those skilled in the art that dicarboxylic monomers predominantly polymerize in the aqueous phase of the latex. Examples of other suitable unsaturated carboxylic acid monomers are disclosed in U.S. Pat. No. 4,156,669.

The term "acrylate", as used herein, is meant to include monomers of the acrylate or methacrylate type. Additionally, the acrylates can include acids, esters, amides and substituted derivatives thereof. Generally, the preferred acrylates are $C_1$-$C_8$ alkyl acrylates or methacrylates. Examples of such acrylates include butyl acrylate, 4-biphenyl acrylate, hexyl acrylate, tert-butyl acrylate, methylmethacrylate, butylmethacrylate, lauryl methacrylate, hexylmethacrylate, isobutylmethacrylate, and isopropylmethacrylate. The preferred acrylates are butyl acrylate and methylmethacrylate.

The precise monomeric composition of the soft (i.e., having a $T_g$ of less than about 25° C.) core portion of the latex is not particularly critical. Generally, the core portion comprises copolymers of vinylidene halide or vinyl halide and 1,3-butadiene; or styrene and 1,3-butadiene. Any of the aforementioned monomers can be copolymerized into the core portion in small amounts.

The core portion comprises a major portion of the latex. That is, the core portion comprises from about 50 to about 95 weight percent of the latex. Typically, the core portion is comprised of, based on the weight of the core portion, of from about 15 to about 75 weight percent vinylidene halide, vinyl halide, monovinyl aromatic monomer, or a mixture thereof; from about 25 to about 85 weight percent aliphatic conjugated diene; and from about 0 to about 10 weight percent of unsaturated carboxylic acid or any of the other aforementioned monomers.

The monomeric composition of the shell region of the latex is fairly critical in order for the desirable film forming characteristic and tensile or corrosion resistant properties to be achieved. The shell region therefore comprises homopolymers or copolymers of the acrylates; or copolymers of the acrylates and monovinyl aromatic monomers. Optionally, the shell region can comprise a homopolymer or copolymer of the monovinyl aromatic monomer.

The shell portion comprises a minor region of the latex. That is, the shell portion comprises from about 5 to about 50 weight percent of the latex. Typically, the shell portion is comprised of, based on the weight of the shell portion, from about 40 to about 100 percent of an acrylate and/or monovinyl aromatic monomer (hereinafter, jointly referred to as "shell monomers"). The preferred shell monomers are butyl acrylate, methylmethacrylate, t-butyl styrene and styrene. More preferably, the shell monomers are butyl acrylate and methylmethacrylate.

For example, the composition of the shell portion of a latex particle whose film has high strength can typically comprise a copolymer of the selected shell monomers, whose homopolymers exhibit a high glass transition temperature ($T_g$ greater than 25° C.), with the diene monomer of the core portion of the latex (the result of extended butadiene feed), plus some of the unreacted vinylidene chloride (and/or styrene). Preferably, the weight fraction of the shell (weight fraction of shell is equal to the weight of the shell divided by the total weight of the particle) and its monomeric make up are the result of a proper balance to give a film forming structured particle at the required temperature. Preferably, the required temperature is room temperature. Thus, a shell having a weight fraction of 25 percent will require a shell less rich in polymerized hard acrylate (polymerized hard acrylates is defined as those having $T_g$'s over 100° C.) and richer in a softer comonomer to result in a film forming shell composition at room temperature, while a shell having a lower weight fraction of 15 percent could tolerate a higher level of polymerized hard acrylate and/or a high $T_g$ polymer (i.e., t-butylstyrene or styrene) in its composition.

In another aspect of the invention, the shell of the latex particle can be adjusted by extending the core monomer feed (softer comonomer) into the shell monomer feed to form a total shell composition which is film forming at room temperature. That is, as explained above, the softer comonomer portion of a shell rich in high $T_g$ polymer can be obtained by extending the feed of the monomer that made up the core portion of the latex particle.

In another example, the composition of the shell portion of a latex particle which has corrosion resistance when used as an adhesive to metal substrates can typically comprise a copolymer of selected shell monomers which exhibit high water repellency, for example, butyl acrylate or other acrylates with larger alkyl groups. Preferably, the weight fraction of the shell and its monomeric make up are the result of a proper balance to give a film forming structured particle at the required temperature, which preferably is room temperature.

Accordingly, the manner in which the latexes of this invention are prepared is particularly critical. Broadly speaking, the dispersed polymer core particles are encapsulated (i.e., surrounded or encompassed) with a polymeric shell. This is accomplished by emulsion polymerizing the desired shell monomers in the presence of an existing core portion. That is, in a continuous polymerization process the shell is preponderantly added in the latter portion of the reaction.

The latexes of this invention are prepared via a continuous multi-feed emulsion polymerization process. In such a polymerization, a core portion of the latex is first formed. This is accomplished by feeding each of the core monomers (i.e., the aliphatic conjugated dienes, vinylidene halide or vinyl halide, and/or monovinyl aromatic monomers and optionally monoethylenically unsaturated carboxylic acid monomers) which polymerize to form the core portion through separate feeding tanks into the reaction vessel. The rates of addition of the monomers to the reaction vessel can vary, as can addition time periods. However, it is preferable to begin addition of each of the core monomer feeds simultaneously. It is most desirable that a feed of an aqueous mixture of catalyst (and emulsifiers and chelants if desired) by added during the time of addition of all monomers (i.e., during addition times of core monomers as well as during addition times of shell monomers).

The encapsulating shell portion of the latex is formed on the partially formed core portion during the later portion of the continuous polymerization by the addition of shell monomer(s) through separate feeding tank(s). The major portion of the shell monomer(s) addition is commenced at a time which can occur after all of the core monomer feeds have been added to the reaction vessel but before all of said monomers have completely reacted. For example, the shell monomer(s) additions can begin immediately after the last core monomer feed is completed. However, it is most preferable that the shell monomers be fed into the reaction vessel during the final stages of core monomer addition (e.g., after more than about 70 percent of the most lengthy core monomer feed has been added). It is most preferable that the shell monomer feed(s) be completed after the core monomer feeds have been completely added to the reaction vessel. Additional catalyst can be introduced to the reaction vessel after all monomers have been added into said vessel to complete conversion of the monomers. It is also desirable to then continue heating and agitation of the reaction mixture for 0.5 to 6 hours after addition of all additives is complete.

From the foregoing, it will be apparent to the skilled artisan that the precise method of preparation chosen in a given instance will depend upon a variety of factors such as the desired use of the latex, the desired core to shell ratio, the desired monomer content, the reactivities of the various monomers, and the like. Thus, for example, a latex having a relatively large shell portion containing a large amount of methylmethacrylate will exhibit extremely high tensile strength but will not be a good film former at room temperature.

The film forming characteristics at room temperature is dependent upon the glass transition temperature point of the polymer. Polymers with low glass transition temperatures ($T_g$), are better film formers at room temperature than those with high glass transition points. Therefore, in the case of polymethylmethacrylate, $T_g$ 105° C., a shell with a small proportion of methylmethacrylate makes a better film former than a shell with a large proportion of methylmethacrylate. For example, a latex particle with 18 percent methylmethacrylate (predominantly present in the shell) is a good film former at room temperature while a 25 percent concentration would be a marginal film former at room temperature. Preferably, the polymer present in the latex particle contains from about 3 to about 30 percent of acrylates or monovinyl aromatic monomers whose homopolymers have $T_g$'s above 25° C. (predominantly present in the shell). More preferably, the weight of the latex particle portion contains from about 10 to about 20 percent butyl acrylate, methylmethacrylate, t-butylstyrene or styrene polymer present in the shell for good film forming properties at room temperature.

In another aspect of the invention, the polymer present in the latex particle can contain more than 20 percent of the shell monomers, acrylate or monovinyl aromatic monomer, in order to form a structured latex particle which is film forming at elevated temperatures. The preferred range of shell monomers would be greater than that required for the room temperature film forming latex particle (i.e., more than 20 percent) and would be dependent on the particular temperature at which the particle needs to be film forming. These latex particles would be particularly useful where it would be desirable to have a latex which was film forming at application temperatures above ambient.

The polymerization techniques employed in preparing the latexes of this invention are similar to conventional emulsion polymerization techniques. Thus, for example, the monomers to be added during a particular feed time are typically dispersed with agitation sufficient to emulsify the mixture in an aqueous medium which can contain known emulsifying agents. Other ingredients conventionally employed in the art such as polymerization aids such as chain transfer agents, chelants, etc., are also employed. The monomers are subjected to polymerization with the aid of a conventional source for generating free radicals such as conventional free radical polymerization catalysts. Examples of suitable catalysts, chain transfer agents and emulsifying agents are disclosed in U.S. Pat. No. 4,156,669. Optionally, conventional seeding procedures can be employed in the core stage polymerization to aid in the control of such polymerization and in achieving the desired average particle size and particle size distribution for the dispersed core stage copolymer particles. The seed particles are typically employed in amounts corresponding from about 0.1 to about 1 weight percent of the total core monomers, and said particles range in size from about 10 to about 20 percent of the diameter of the core particle to be formed.

Suitable particle sizes for the dispersed latex particles resulting from the process as described hereinbefore can range from about 800 to about 4000, preferably from about 1200 Å to about 3000 Å.

Following polymerization, the solids content of the resulting aqueous heterogeneous latex can be adjusted to the desired level by adding water thereto or by distilling water therefrom. Generally, the desired level of polymeric solids content is from about 20 to about 65, preferably from about 45 to about 60, weight percent on a total weight basis.

In addition, it is also desirable to introduce known additives into the latex dispersion. Typical additives include surfactants, bactericides, neutralizers, antifoamants, etc. Such additives are introduced in a conventional manner.

The heterogeneous aqueous latex particles of the present invention are suitable for use in a variety of applications such as in carpet backsizing, as binders in paper coating applications, as adhesives, as film-forming components, in the manufacture of plywood and particle board, and the like. Of particular interest are those applications where film forming latexes having high tensile strengths are desired and where film forming latexes having corrosion resistance are desired.

The present invention is further illustrated by, though not intended to be limited by, the following examples. In all examples, all reference to parts and percentages are by weight unless otherwise indicated.

EXAMPLE 1

Monomer Charges (a) A monomer charge was prepared which comprised 42 parts of vinylidene chloride and 4 parts of carbon tetrachloride (parts are based on 100 parts monomer).

(b) A second monomer charge was prepared which comprised 34 parts of butadiene.

(c) A third monomer charge was prepared which comprised 22 parts of methylmethacrylate.

(d) A fourth monomer charge was prepared which comprised 23 parts of deionized water, 2 parts of itaconic acid and 0.4 part of sodium hydroxide.

(e) An aqueous charge was prepared comprising 7.5 parts of deionized water, 0.15 part of sodium hydroxide, 0.6 part of sodium persulfate, 0.5 part DOWFAX® 2A1 surfactant, and 0.02 part of chelant (i.e., pentasodium salt of diethylenetriamine pentaacetic acid)

(f) A second aqueous charge was prepared which comprised 5 parts of deionized water, 0.4 part of sodium persulfate, and 0.05 part of sodium hydroxide.

POLYMERIZATION PROCESS

To a one-gallon stainless steel reactor having an agitator and 6 inlets for the addition of the aforementioned charges was added 42.8 parts of deionized water, 0.05 part of chelant and 0.5 part of a 0.025 micrometer average diameter 96:4 weight ratio styrene/acrylic acid copolymer latex. The reactor was purged with nitrogen, agitated at 215 rpm and heated to 90° C.

The monomer charge (a) containing vinylidene chloride was added to the reactor, beginning at time=0 minutes for a total of 200 minutes. The butadiene-containing charge (b) was added to the reactor, beginning at time=0 minutes for a total of 250 minutes. The charge (d) containing itaconic acid was added to the reactor beginning at time=3 minutes for a total of 247 minutes. The first aqueous charge (e) was added to the reactor beginning at time=3 minutes for a total of 267 minutes.

At time=200 minutes, charge (c) containing methylmethacrylate was added to the reactor for a total of 70 minutes. At time=270 minutes, the second aqueous charge (f) was added to the reactor for a total of 120 minutes.

Following the addition of all the aqueous charges (i.e., at time=390), the mixture was continued to be agitated at 95° C. under nitrogen for 1 hour.

EXAMPLE 2

Latex particles were prepared with the polymerization process of Example 1 while employing the following monomer and aqueous charges.

MONOMER CHARGES (a) A monomer charge was prepared which comprised 44 parts of vinylidene chloride and 4 parts of carbon tetrachloride (parts are based on 100 parts monomer).

(b) A second monomer charge was prepared which comprised 36 parts of butadiene.

(c) A third monomer charge was prepared which comprised 18 parts of methylmethacrylate.

(d) A fourth monomer charge was prepared which comprised 23 parts of deionized water, 2 parts of itaconic acid and 0.4 part of sodium hydroxide.

(e) An aqueous charge was prepared comprising 7.5 parts of deionized water, 0.15 part of sodium hydroxide, 0.6 part of sodium persulfate, 0.5 part DOWFAX 2A1 surfactant, and 0.02 part of chelant (i.e., pentasodium salt of diethylenetriamine pentaacetic acid)

(f) A second aaqueous charge was prepared which comprised 5 parts of deionized water, 0.4 part of sodium persulfate, and 0.05 part of sodium hydroxide.

EXAMPLE 3

Latex particles were prepared with the polymerization process of Example 1 while employing the following monomer and aqueous charges.

MONOMER CHARGES

A monomer charge was prepared which comprised 46 parts of vinylidene chloride and 4 parts of carbon tetrachloride (parts are based on 100 parts monomer).

A second monomer charge was prepared which comprised 38 parts of butadiene.

A third monomer charge was prepared which comprised 14 parts of methylmethacrylate.

A fourth monomer charge was prepared which comprised 23 parts of deionized water, 2 parts of itaconic acid and 0.4 part of sodium hydroxide.

An aqueous charge was prepared comprising 7.5 parts of deionized water, 0.15 part of sodium hydroxide, 0.6 part of sodium persulfate, 0.5 part DOWFAX 2A1 surfactant, and 0.02 part of chelant (i.e., pentasodium salt of diethylenetriamine pentaacetic acid)

A second aqueous charge was prepared which comprised 5 parts of deionized water, 0.4 part of sodium persulfate, and 0.05 part of sodium hydroxide.

Latex films were prepared at room temperature from Examples 1, 2 and 3, and their normal and hot (5 minutes at 100° C.) tensile, elongation, and work (area under curve of tensile versus elongation values) were measured. These properties are tabulated below in Table I.

TABLE I

| Example | Parts of MMA[1] | Physical Properties | | | | | |
|---|---|---|---|---|---|---|---|
| | | Tensile (kg/sq. cm.) | | Elongation (%) | | Work[2] (kg/cm$^2$) | |
| | | Normal | Hot | Normal | Hot | Normal | Hot |
| 1 | 22 | 135 | 183 | 60 | 250 | 73.18 | 330.74 |
| 2 | 18 | 200 | 171 | 315 | 334 | 381.83 | 358.25 |
| 3 | 14 | 218 | 118 | 329 | 270 | 420.95 | 188.24 |

[1] methylmethacrylate
[2] Area under the curve of tensile versus elongation, representing work per unit volume.

The data indicates that the films of the subject latex particles exhibit high tensile properties while maintaining good elongation. These properties translate to good film strength. Examples 1–3 show the change in physical properties which can be obtained by varying the amount of methylmethacrylate in the shell portion of the latex particle. In particular, Example 1 demonstrates poorer properties because it has a higher methylmethacrylate content in the shell (22 percent) which, therefore, means it would be a marginal film former at room temperature, as per the teaching of the subject invention. Example 1 can be compared to Examples 2 and 3 which contained less methylmethacrylate (18 percent and 14 percent, respectively) and showed better film tensile properties. Alternatively, Example 1 showed better physical properties under "hot" conditions which demonstrate that under heated conditions the film property of a latex containing more methylmethacrylate (i.e., higher $T_g$) performs equally well to better as was expected. However, the data more importantly shows that the latex particles with lower methylmethacrylate content in the shell, Examples 2 and 3, formed a film with excellent tensile and elongation values under normal conditions. However, Example 2 also showed excellent tensile and elongation strength under hot conditions (5 minutes at 100° C.), indicating the importance of the relationship between temperature of end use and levels of monomers in the shell to achieve optimum performance.

In summary, Examples 2 and 3 showed high strength properties under normal conditions, Examples 1 and 2 showed high strength properties under hot conditions and, accordingly, Example 2, which contained an intermediate amount of methylmethacrylate, showed high strength for the wide temperature range, i.e., normal to hot.

EXAMPLE 4

Monomer Charges (a) A monomer charge was prepared which comprised 42 parts of vinylidene chloride and 7 parts of carbon tetrachloride (parts are based on 100 parts monomer).

(b) A second monomer charge was prepared which comprised 34 parts of butadiene.

(c) A third monomer charge was prepared which comprised 22 parts of butyl acrylate.

(d) A fourth monomer charge was prepared which comprised 18 parts of deionized water, 2 parts of itaconic acid and 0.3 part of sodium hydroxide.

(e) An aqueous charge was prepared comprising 7.5 parts of deionized water, 0.15 part of sodium hydroxide, 0.6 part of sodium persulfate, 0.5 part DOWFAX® 2A1 surfactant, and 0.02 part of chelant (i.e., pentasodium salt of diethylenetriamine pentaacetic acid)

(f) A second aqueous charge was prepared which comprised 2.7 parts of deionized water, 0.4 part of sodium persulfate, and 0.05 part of sodium hydroxide.

POLYMERIZATION PROCESS

To a one-gallon stainless steel reactor having an agitator and 6 inlets for the addition of the aforementioned charges was added 44.80 parts of deionized water, 0.05 part of chelant and 0.5 part of a 0.025 micrometer average diameter 96:4 weight ratio styrene/acrylic acid copolymer latex. The reactor was purged with nitrogen, agitated at 215 rpm and heated to 90° C.

The monomer charge (a) containing vinylidene chloride was added to the reactor, beginning at time=0 minutes for a total of 200 minutes. The butadiene-containing charge (b) was added to the reactor, beginning at time=0 minutes for a total of 250 minutes. The charge containing itaconic acid (d) was added to the reactor beginning at time=3 minutes for a total of 197 minutes. The first aqueous charge (e) was added to the reactor beginning at time=3 minutes for a total of 267 minutes.

At time=199 minutes, charge (c) containing butylacrylate was added to the reactor for a total of 71 minutes. At time=270 minutes, the second aqueous charge (f) was added to the reactor for a total of 60 minutes.

Following the addition of all the aqueous charges (i.e., at time=330), the mixture was continued to be agitated at 90° C. under nitrogen for 1 hour.

EXAMPLE 5

Monomer Charges (a) A monomer charge was prepared which comprised 42 parts of vinylidene chloride and 4 parts of carbon tetrachloride (parts are based on 100 parts monomer).

(b) A second monomer charge was prepared which comprised 34 parts of butadiene.

(c) A third monomer charge was prepared which comprised 22 parts of methylacrylate.

(d) A fourth monomer charge was prepared which comprised 23 parts of deionized water, 2 parts of itaconic acid and 0.4 part of sodium hydroxide.

(e) An aqueous charge was prepared comprising 7.5 parts of deionized water, 0.15 part of sodium hydroxide, 0.6 part of sodium persulfate, 0.5 part DOWFAX 2A1 surfactant, and 0.02 part of chelant (i.e., pentasodium salt of diethylenetriamine pentaacetic acid)

(f) A second aqueous charge was prepared which comprised 5 parts of deionized water, 0.4 part of sodium persulfate, and 0.05 part of sodium hydroxide.

POLYMERIZATION PROCESS

To a one-gallon stainless steel reactor having an agitator and 6 inlets for the addition of the aforementioned charges was added 40.22 parts of deionized water, 0.05 part of chelant and 0.5 part of a 0.025 micrometer average diameter 96:4 weight ratio styrene/acrylic acid copolymer latex. The reactor was purged with nitrogen, agitated at 215 rpm and heated to 90° C.

The monomer charge (a) containing vinylidene chloride was added to the reactor, beginning at time=0 minutes for a total of 200 minutes. The butadiene-containing charge (b) was added to the reactor, beginning at time=0 minutes for a total of 250 minutes. The charge (d) containing itaconic acid was added to the reactor beginning at time=3 minutes for a total of 197 minutes. The first aqueous charge (e) was added to the reactor beginning at time=3 minutes for a total of 267 minutes.

At time=200 minutes, charge (c) containing methylacrylate was added to the reactor for a total of 70 minutes. At time=270 minutes, the second aqueous charge (f) was added to the reactor for a total of 120 minutes.

Following the addition of all the aqueous charges (i.e., at time=390), the mixture was agitated at 95° C. under nitrogen for 1 hour.

EXAMPLE 6

Monomer Charges (a) A monomer charge was prepared which comprised 42 parts of vinylidene chloride and 4 parts of carbon tetrachloride (parts are based on 100 parts monomer).

(b) A second monomer charge was prepared which comprised 34 parts of butadiene.

(c) A third monomer charge was prepared which comprised 22 parts of methylmethacrylate.

(d) A fourth monomer charge was prepared which comprised 23 parts of deionized water, 2 parts of itaconic acid and 0.4 part of sodium hydroxide.

(e) An aqueous charge was prepared comprising 7.5 parts of deionized water, 0.15 part of sodium hydroxide, 0.6 part of sodium persulfate, 0.5 part DOWFAX® 2A1 surfactant, and 0.02 part of chelant (i.e., pentasodium salt of diethylenetriamine pentaacetic acid)

(f) A second aqueous charge was prepared which comprised 5 parts of deionized water, 0.4 part of sodium persulfate, and 0.05 part of sodium hydroxide.

POLYMERIZATION PROCESS

To a one-gallon stainless steel reactor having an agitator and 6 inlets for the addition of the aforementioned charges was added 42.8 parts of deionized water, 0.05 part of chelant and 0.5 part of a 0.025 micrometer average diameter 96:4 weight ratio styrene/acrylic acid copolymer latex. The reactor was purged with nitrogen, agitated at 215 rpm and heated to 90° C.

The monomer charge (a) containing vinylidene chloride was added to the reactor, beginning at time=0 minutes for a total of 200 minutes. The butadiene-containing charge (b) was added to the reactor, beginning at time=0 minutes for a total of 250 minutes. The charge (d) containing itaconic acid was added to the reactor beginning at time=3 minutes for a total of 197 minutes. The first aqueous charge (e) was added to the reactor beginning at time=3 minutes for a total of 267 minutes.

At time=200 minutes, charge (c) containing methylmethacrylate was added to the reactor for a total of 70 minutes. At time=270 minutes, the second aqueous charge (f) was added to the reactor for a total of 120 minutes.

Following the addition of all the aqueous charges (i.e., at time=390), the mixture was agitated at 95° C. under nitrogen for 1 hour.

In order to demonstrate the corrosion resistant aspect of the subject invention, the corrosion resistant properties of the structured latex particles containing vinylidene chloride from Examples 4, 5 and 6 were evaluated. It was shown that when the butyl acrylate monomer was employed in the shell of the latex particle (Example 4) improved corrosion resistance was obtained.

The corrosion properties of Examples 4, 5 and 6 were evaluated in the following manner. To a 0.5 mil aluminum foil cleaned with isopropyl alcohol was applied a film of each Example and a 30 lb/3MSF bleached kraft paper was placed in contact with the wet latex film side. The laminates were then dried at 23° C. for 30 minutes plus 1 minute at 121° C.

The laminates prepared from each Example (4, 5 and 6) were then exposed in a Blue M humidity chamber at 95 percent relative humidity and 65.6° C. Three samples for each Example were exposed for 30 days and evaluated at various intervals for number of pinholes in the laminate under a bright light. The pinholes observed before exposure were marked to separate those which resulted from the exposure (i.e., corrosion). The results from this testing are tabulated below in Table II.

TABLE II

| | | Corrosion Testing | | | |
|---|---|---|---|---|---|
| | | Number of Pinholes | | | |
| Example | Shell Monomer | 1-Day | 7-Days | 14-Days | 30-Days |
| 4 | Butyl Acrylate | 0 | 0 | 1 | 54 |
| | | 0 | 0 | 0 | 3 |
| | | 0 | 0 | 0 | 30 |
| 5 | Methyl Acrylate | 0 | 42 | >100 | >100 |
| | | 0 | 0 | 83 | >100 |
| | | 0 | 11 | 72 | >100 |
| 6 | Methyl Methacrylate | 5 | 5 | 11 | >100 |
| | | 1 | 1 | 17 | >100 |
| | | 0 | 1 | 13 | >100 |

The results from Table II showed excellent corrosion resistance for Example 4, which contained the butyl acrylate shell monomer. It is believed that the butyl acrylate monomer is sufficiently hydrophobic to restrict the passage of water to the core which contributes to the improved corrosive resistance. It is therefore within the scope of this invention to employ other monomers in the process of this invention which are sufficiently hydrophobic to restrict the passage of water to the latex core (e.g., lauryl methacrylate, hexyl acrylate and vinyl stearate).

The foregoing examples have been provided to demonstrate the subject invention and are not deemed to be limitations thereof. It is believed that other means for employing the subject process can be determined by those skilled in the art without departing from the spirit of the invention herein disclosed and described.

What is claimed is:

1. A process for preparing a structured latex particle whose film exhibits good film strength having a core and shell region by a continuous addition emulsion polymerization technique wherein said core region is formed from core monomer feeds comprising:
   (a) aliphatic conjugated diene monomer feed,
   (b) vinylidene halide or vinyl halide monomer feed, and/or
   (c) monovinyl aromatic monomer feed,
   (d) from about 0 to about 10 percent by weight monoethylenically unsaturated carboxylic acid monomer feed;

and said shell region is formed from shell monomer feeds comprising:
   (e) from about 10 to about 20 percent by weight of said latex particle of an acrylate monomer feed, and/or
   (f) a monovinyl aromatic monomer or extended core monomer feed (c); and
   (g) extended core monomer feeds comprising, independently, (a), (b) or (d);

wherein said process is characterized by adjusting the feed rate of said shell monomer feeds such that as the weight fraction of the shell increases the feed rate of said (e) and (f) monomers are decreased, whereby a shell region which encapsulates said core region is formed and said structured latex particle is rendered film forming at room temperature.

2. The process of claim 1 wherein said core monomer feed (a) is butadiene.

3. The process of claim 1 wherein said core monomer feed (b) is vinylidene chloride.

4. The process of claim 1 where said shell monomer feed (e) is $C_1$-$C_8$ alkyl acrylates or methacrylates.

5. The process of claim 4 wherein said shell monomer feed (e) is butyl acrylate.

6. The process of claim 1 where the homopolymer of said shell monomer feed (e) has a $T_g$ greater than 25° C.

7. The process of claim 6 where said shell monomer feed (e) is methylmethacrylate.

8. The process of claim 1 where the homopolymer of said shell monomer feed (f) has a $T_g$ greater than 25° C.

9. The process of claim 8 where said shell monomer feed (f) is t-butylstyrene or styrene.

10. A structured latex particle whose film exhibits good film stength prepared by a continuous addition emulsion polymerization technique wherein said core region is formed from core monomer feeds comprising:
   (a) aliphatic conjugated diene monomer feed,
   (b) vinylidene halide or vinyl halide monomer feed, and/or
   (c) monovinyl aromatic monomer feed,
   (d) from about 0 to about 10 weight monoethylenically unsaturated carboxylic acid monomer feed;
and said shell region is formed from shell monomer feeds comprising:
   (e) from about 10 to about 20 percent by weight of said latex particle of an acrylate monomer feed, and/or
   (f) a monovinyl aromatic monomer or extended core monomer feed (c); and
   (g) extended core monomer feeds comprising, independently, (a), (b) or (d);
wherein said process is characterized by adjusting the feed rate of said shell monomer feeds such that as the weight fraction of the shell increases the feed rate of said (e) and (f) monomers are decreased, whereby a shell region which encapsulates said core region is formed and said structured latex particle is rendered film forming at room temperature.

11. The structured latex particle of claim 10 where said (e) is $C_1$–$C_8$ alkyl acrylates or methacrylates.

12. The structured latex particle of claim 11 where said (e) is butyl acrylate.

13. The structured latex particle of claim 11 where the homopolymer of said (e) has a $T_g$ greater than 25° C.

14. The structured latex particle of claim 13 where said (e) is methylmethacrylate.

15. The structured latex particle of claim 10 where the homopolymer of said (f) has a $T_g$ greater than 25° C.

16. The structured latex particle of claim 15 where said (f) is t-butylstyrene or styrene.

17. A film formed from the structured latex particle of claim 10.

18. The film of claim 17 where said shell monomer feed (e) is butyl acrylate such that said film has improved corrosion resistance.

19. A structured latex particle whose film exhibits corrosion resistance prepared by a continuous addition emulsion polymerization technique wherein said core region is formed from core monomer feeds comprising:
   (a) aliphatic conjugated diene monomer feed,
   (b) vinylidene halide or vinyl halide monomer feed, and/or
   (c) monovinyl aromatic monomer feed, and
   (d) from about 0 to about 10 weight monoethylenically unsaturated carboxylic acid monomer feed;
and said shell region is formed from shell monomer feeds comprising:
   (e) a butyl acrylate monomer feed, and
   (f) extended core monomer feeds comprising independently, (a), (b) or (d);
wherein said process is characterized by adjusting the feed rate of said shell monomer feeds such that as the weight fraction of the shell increases the feed rate of said (e) monomer is decreased, whereby a shell region which encapsulates said core region is formed and said structured latex particle is rendered film forming at room temperature.

20. The structured latex particle of claim 19 where said feed rate adjustment is such that from about 3 to about 30 percent by weight of said latex particle is (e).

* * * * *